US012188402B2

(12) United States Patent
Elogab et al.

(10) Patent No.: US 12,188,402 B2
(45) Date of Patent: Jan. 7, 2025

(54) FORCED INDUCTION SYSTEM AND METHOD OF FORCED INDUCTION FOR AN INTERNAL COMBUSTION ENGINE

(71) Applicant: OGAB LTD, St. Albans (GB)

(72) Inventors: Osama Elogab, St. Albans (GB); Zachary Elogab, St. Albans (GB)

(73) Assignee: OGAB LTD, St. Albans (GB)

( * ) Notice: Subject to any disclaimer, the term of this patent is extended or adjusted under 35 U.S.C. 154(b) by 0 days.

(21) Appl. No.: 18/534,709

(22) Filed: Dec. 10, 2023

(65) Prior Publication Data

US 2024/0102415 A1 Mar. 28, 2024

Related U.S. Application Data

(63) Continuation of application No. PCT/IB2022/054902, filed on May 25, 2022.

(51) Int. Cl.
*F02B 37/007* (2006.01)
*F02B 29/02* (2006.01)
(Continued)

(52) U.S. Cl.
CPC ............ *F02B 37/007* (2013.01); *F02B 29/02* (2013.01); *F02B 33/00* (2013.01); *F02B 33/32* (2013.01);
(Continued)

(58) Field of Classification Search
CPC ........ F02B 37/007; F02B 29/02; F02B 33/00; F02B 33/32; F02B 37/013; F02B 37/04;
(Continued)

(56) References Cited

U.S. PATENT DOCUMENTS

2004/0003719 A1* 1/2004 Le ...................... B01D 39/1676
55/498
2015/0128589 A1* 5/2015 Kim ...................... F02B 37/04
903/905

FOREIGN PATENT DOCUMENTS

CN 102182589 9/2011
CN 110529234 12/2019
(Continued)

OTHER PUBLICATIONS

WIPO, International Search Report in corresponding PCT application PCT/IB2022/054902, Sep. 14, 2022.
(Continued)

*Primary Examiner* — Brandon D Lee
(74) *Attorney, Agent, or Firm* — Alley IP

(57) ABSTRACT

Various types of forced induction systems are known for various types of internal combustions engines, including turbochargers and superchargers typically used in cars. The present system includes a first compressor 2 configured to produce a first stream of gas 3, an air multiplier 4 arranged to receive the first stream of gas 3 and eject the first stream of gas 3 over a Coandă surface, the air multiplier 4 configured to entrain ambient air 5 with the ejected first stream of gas to produce a second stream of gas 8, and a second compressor 9 arranged to receive the second stream of gas 8, and configured to compress the second stream of gas 8 for supply to an internal combustion engine. In this way, a mass of air being introduced into an internal combustion engine can be increased, by virtue of the air multiplier 4 upstream of the second compressor 9.

6 Claims, 4 Drawing Sheets

(51) Int. Cl.
    *F02B 33/00*     (2006.01)
    *F02B 33/32*     (2006.01)
    *F02B 37/013*     (2006.01)
    *F02B 37/04*     (2006.01)
    *F02M 35/024*     (2006.01)

(52) U.S. Cl.
    CPC ............ *F02B 37/013* (2013.01); *F02B 37/04* (2013.01); *F02M 35/024* (2013.01)

(58) Field of Classification Search
    CPC ........... F02M 35/024; F02M 35/10157; F02M 35/10262; F04F 5/16; F04F 5/18; F04F 5/46
    See application file for complete search history.

(56) References Cited

FOREIGN PATENT DOCUMENTS

| | | | |
|---|---|---|---|
| EP | 2873827 | 5/2015 | |
| JP | 2017061887 | 3/2017 | |
| KR | 20120072077 | 7/2012 | |
| WO | 2008136641 | 11/2008 | |
| WO | WO-2008136641 A1 * | 11/2008 | ............. F02M 26/15 |

OTHER PUBLICATIONS

WIPO, Written Opinion in corresponding PCT application PCT/IB2022/054902, Sep. 14, 2022.

\* cited by examiner

FORCED INDUCTION SYSTEM AND METHOD OF FORCED INDUCTION FOR AN INTERNAL COMBUSTION ENGINE

RELATED APPLICATIONS

This application claims the benefit under 35 U.S.C. § 120, and is a continuation, of co-pending International Application PCT/IB2022/054902, filed May 25, 2022 and designating the US, which claims priority to GB Application 2108284.7, filed Jun. 10, 3021, such GB Applications also being claimed priority to under 35 U.S.C. § 119. These GB and International applications are incorporated by reference herein in their entireties.

FIELD

The present invention relates generally to a forced induction system and a method of forced induction for an internal combustion engine, and finds particular, although not exclusive, utility in sports cars.

BACKGROUND

Various types of forced induction systems are known for various types of internal combustions engines, including turbochargers and superchargers typically used in cars. However, other forms of internal combustion engines also use forced induction, such as in many forms of jet engine.

SUMMARY

According to a first aspect of the present inventions, there is provided a forced induction system for an internal combustion engine, the forced induction system comprising: a first compressor configured to produce a first stream of gas; an air multiplier arranged to receive the first stream of gas and eject the first stream of gas over a Coandă surface, the air multiplier configured to entrain ambient air with the ejected first stream of gas to produce a second stream of gas; and a second compressor arranged to receive the second stream of gas, and configured to compress the second stream of gas for supply to an internal combustion engine.

In this way, a mass of air being introduced into an internal combustion engine can be increased, by virtue of the air multiplier upstream of the second compressor.

The first compressor may comprise a pump, for instance an air pump. The first stream of gas may comprise a first stream of air. The first stream of gas may be above ambient, and may comprise a comprise a compressed air stream.

The air multiplier may comprise an air amplifier. The air multiplier may comprise a device which use a first amount of compressed air to generate a second flow of air larger than the first amount. The air multiplier may operate by taking advantage of an aerodynamic effect known as "the Coandă effect". The Coandă surface may be a curved surface. The air multiplier may increase airflow by up to 40 times, in particular a factor of between 5 and 18 times.

The air multiplier may comprise a plurality of air multipliers. For example, a first air multiplier may be located at a first location along the passage, and a second air multiplier may be located at a second location along the passage.

The air multiplier may take the first stream of gas and eject it though an air outlet adjacent to a "Coandă" surface, thereby entraining surrounding air. In particular, the air outlet may be configured to eject the gas substantially over the Coandă surface.

The Coandă surface may be located around an internal perimeter of the passage. In particular, the Coandă surface may form a closed loop around the internal perimeter of the passage. Similarly, the air outlet may be located around an internal perimeter of a passage. In particular, the air outlet may form a closed loop around the internal perimeter of the passage. The air outlet may comprise a ring nozzle.

The first stream of gas may have a pressure of between 1 bar and 4 bar, in particular between 2 bar and 3 bar, more particularly approximately 2.5 bar.

The first stream of gas may be conveyed to the air multiplier via a feed line.

The first stream of gas may have a temperature below ambient. In this way, air being supplied to the air multiplier may be more dense than ambient air. However, in alternative arrangements the compressed air stream may have a temperature above ambient, or a temperature that is substantially equal to ambient.

The system may further comprise a vortex tube configured to supply the compressed air stream. The vortex tube may be, for example, a Ranque-Hilsch vortex tube.

The second stream of gas may be a combination of the first stream of gas and the entrained ambient air.

The second compressor may comprise any conventional forma of compressor currently used, or contemplated, in existing forced inductions systems.

The forced induction system may further comprise a screen for filtering the ambient air prior to its entrainment by the air multiplier. In this way, damage to the air multiplier from grit and/or particulates can be prevented. The screen may comprise a grille and/or mesh.

According to a second aspect of the present invention, there is provided an internal combustion engine system comprising: the forced induction system of the first aspect; and an internal combustion engine arranged to receive the compressed second stream of gas from the second compressor.

The internal combustion engine may comprise any form of such engine, including a diesel engine, petrol engine, jet engine, etc.

The first and/or second compressor may be driven by an exhaust of the internal combustion engine.

In particular, the system may further comprise a turbine driven by exhaust gasses of the vehicle, and the turbine may be configured to power the first and/or second compressor. In this way, waste energy from an engine may be used to power the system. The turbine may form part of a conventional turbocharger that includes the second compressor. Accordingly, waste energy from the turbo may be used to power the system.

The turbine may be configured to mechanically drive the first and/or second compressor, or may drive the first and/or second compressor via alternative means, such as via an alternator and/or other electrical components.

Alternatively or additionally, the compressor may be driven by an electrical motor powered by an engine of the vehicle, by a drive shaft of the engine, or by a battery.

According to a third aspect of the present invention, there is provided a method of forced induction for an internal combustion engine, the method comprising: providing the system of the first aspect; using the first compressor to produce a first stream of gas; using the air multiplier to eject the first stream of gas over a Coandă surface, and entrain ambient air with the ejected first stream of gas to produce a second stream of gas; and using the second compressor to compress the second stream of air.

The method may further comprise the step of supplying the compressed second stream of air to an internal combustion engine.

BRIEF DESCRIPTION OF THE DRAWINGS

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

DETAILED DESCRIPTION

Figure 1:
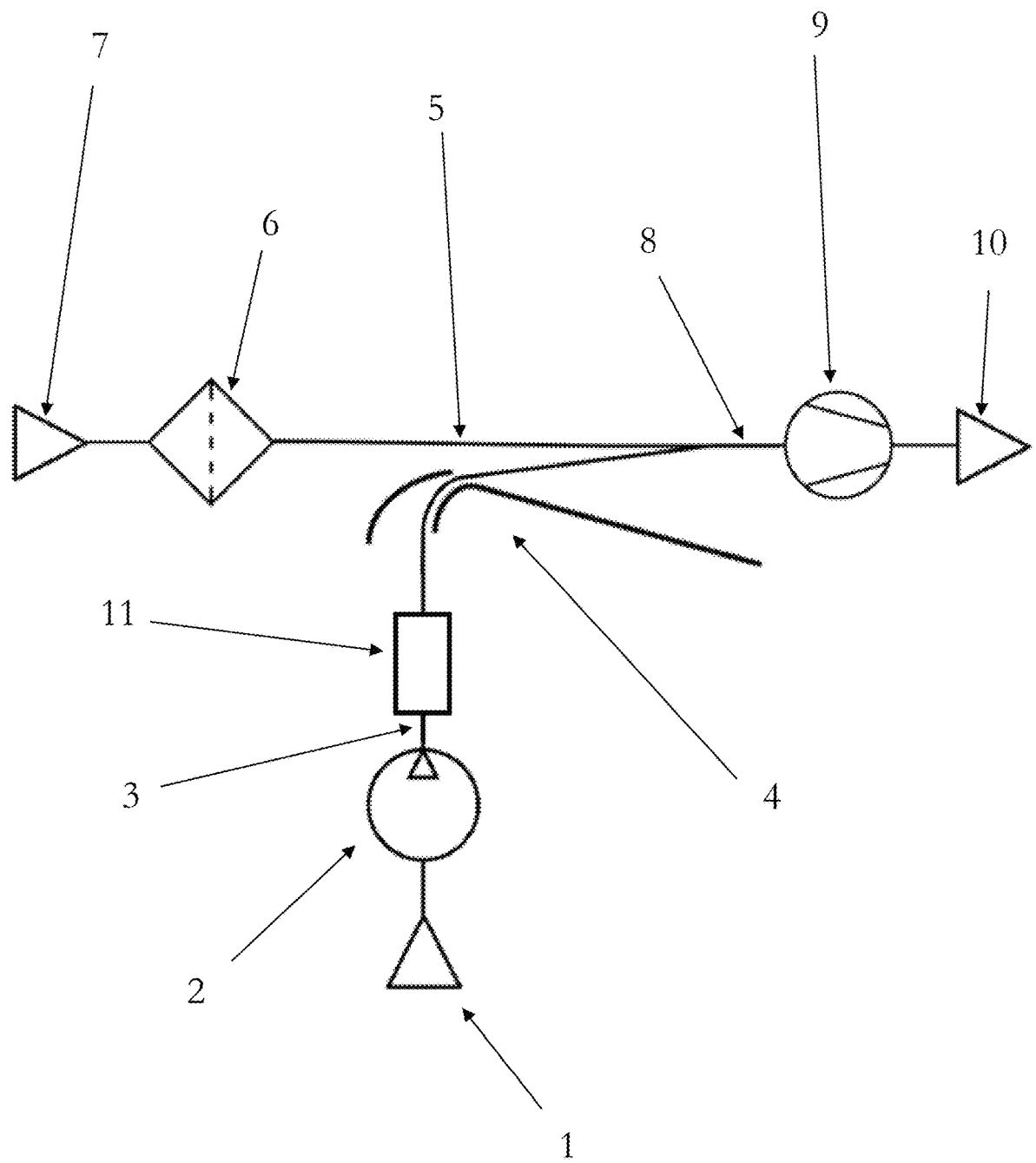
FIG. 1 is schematic representation of a forced induction system.

The present invention will be described with respect to certain drawings but the invention is not limited thereto but only by the claims. The drawings described are only schematic and are non-limiting. Each drawing may not include all of the features of the invention and therefore should not necessarily be considered to be an embodiment of the invention. In the drawings, the size of some of the elements may be exaggerated and not drawn to scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that operation is capable in other sequences than described or illustrated herein. Likewise, method steps described or claimed in a particular sequence may be understood to operate in a different sequence.

Moreover, the terms top, bottom, over, under and the like in the description and the claims are used for descriptive purposes and not necessarily for describing relative positions. It is to be understood that the terms so used are interchangeable under appropriate circumstances and that operation is capable in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Similarly, it is to be noticed that the term "connected", used in the description, should not be interpreted as being restricted to direct connections only. Thus, the scope of the expression "a device A connected to a device B" should not be limited to devices or systems wherein an output of device A is directly connected to an input of device B. It means that there exists a path between an output of A and an input of B which may be a path including other devices or means. "Connected" may mean that two or more elements are either in direct physical or electrical contact, or that two or more elements are not in direct contact with each other but yet still co-operate or interact with each other. For instance, wireless connectivity is contemplated.

Reference throughout this specification to "an embodiment" or "an aspect" means that a particular feature, structure or characteristic described in connection with the embodiment or aspect is included in at least one embodiment or aspect of the present invention. Thus, appearances of the phrases "in one embodiment", "in an embodiment", or "in an aspect" in various places throughout this specification are not necessarily all referring to the same embodiment or aspect, but may refer to different embodiments or aspects. Furthermore, the particular features, structures or characteristics of any one embodiment or aspect of the invention may be combined in any suitable manner with any other particular feature, structure or characteristic of another embodiment or aspect of the invention, as would be apparent to one of ordinary skill in the art from this disclosure, in one or more embodiments or aspects.

Similarly, it should be appreciated that in the description various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Moreover, the description of any individual drawing or aspect should not necessarily be considered to be an embodiment of the invention. Rather, as the following claims reflect, inventive aspects lie in fewer than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some features included in other embodiments, combinations of features of different embodiments are meant to be within the scope of the invention, and form yet further embodiments, as will be understood by those skilled in the art. For example, in the following claims, any of the claimed embodiments can be used in any combination.

In the description provided herein, numerous specific details are set forth. However, it is understood that embodiments of the invention may be practised without these specific details. In other instances, well-known methods, structures and techniques have not been shown in detail in order not to obscure an understanding of this description.

In the discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

The use of the term "at least one" may mean only one in certain circumstances. The use of the term "any" may mean "all" and/or "each" in certain circumstances.

The principles of the invention will now be described by a detailed description of at least one drawing relating to exemplary features. It is clear that other arrangements can be configured according to the knowledge of persons skilled in the art without departing from the underlying concept or technical teaching, the invention being limited only by the terms of the appended claims.

FIG. 1 is schematic representation of a forced induction system in which air is provided 1 to a first compressor 2 and compressed into a first (compressed air) gas stream 3. Vortex tube 11 is arranged to supply the first stream of gas 3 to an air multiplier 4. The air multiplier 4 is arranged to receive the first stream of gas 3 and eject the first stream of gas 3 over a Coandă surface, the air multiplier configured to entrain ambient air 5 with the ejected first stream of gas 3 to produce a second stream of gas 8.

The ambient air 5 may be provided through a filter 6 from an external source 7 (for instance outside a vehicle).

A second compressor 9 is arranged to receive the second stream of gas 8, and is configured to compress the second stream of gas 8 for supply at 10 to an internal combustion engine (not shown).

Figure 2:
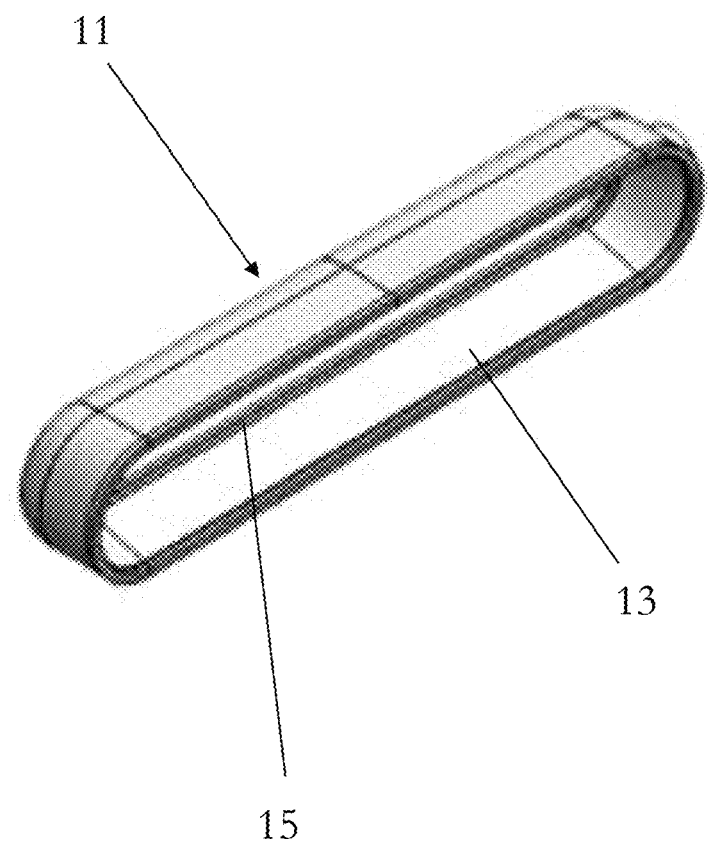
FIG. 2 is a perspective view of a possible air multiplier for use in the system of FIG. 1.

FIG. 2 is a perspective view of a possible air multiplier for use in the system of FIG. 1. The air multiplier comprises a closed loop 11. In particular the closed loop 11 is substantially prismatic in form, having an axial cross section that is substantially lozenge-shape; that is, having two opposing ends that are semi-circular connected by substantially flat and parallel upper and lower walls.

On an interior surface of the closed loop 11 is provided a Coandă surface 13 that extends around an entire internal periphery of the interior surface. At one axial end of the interior surface, adjacent to the Coandă surface 13 is a compressed air outlet 15. The compressed air outlet 15 is arranged in the form of a ring that extends around an entire internal periphery of the interior surface, and is configured to eject air over the Coandă surface 13.

FIG. 3(a) shows a front axial plan view of the air multiplier of FIG. 2. FIG. 3(b) shows a bottom-up plan view of the air multiplier of FIG. 2. A compressed air inlet 17 is shown on the right-hand side thereof, for supplying a compressed air stream into an interior of the closed loop 11. Typical measurements are shown in millimetres, but any or all of these could vary by up to an order of magnitude from those shown and still be effective.

Figure 3:
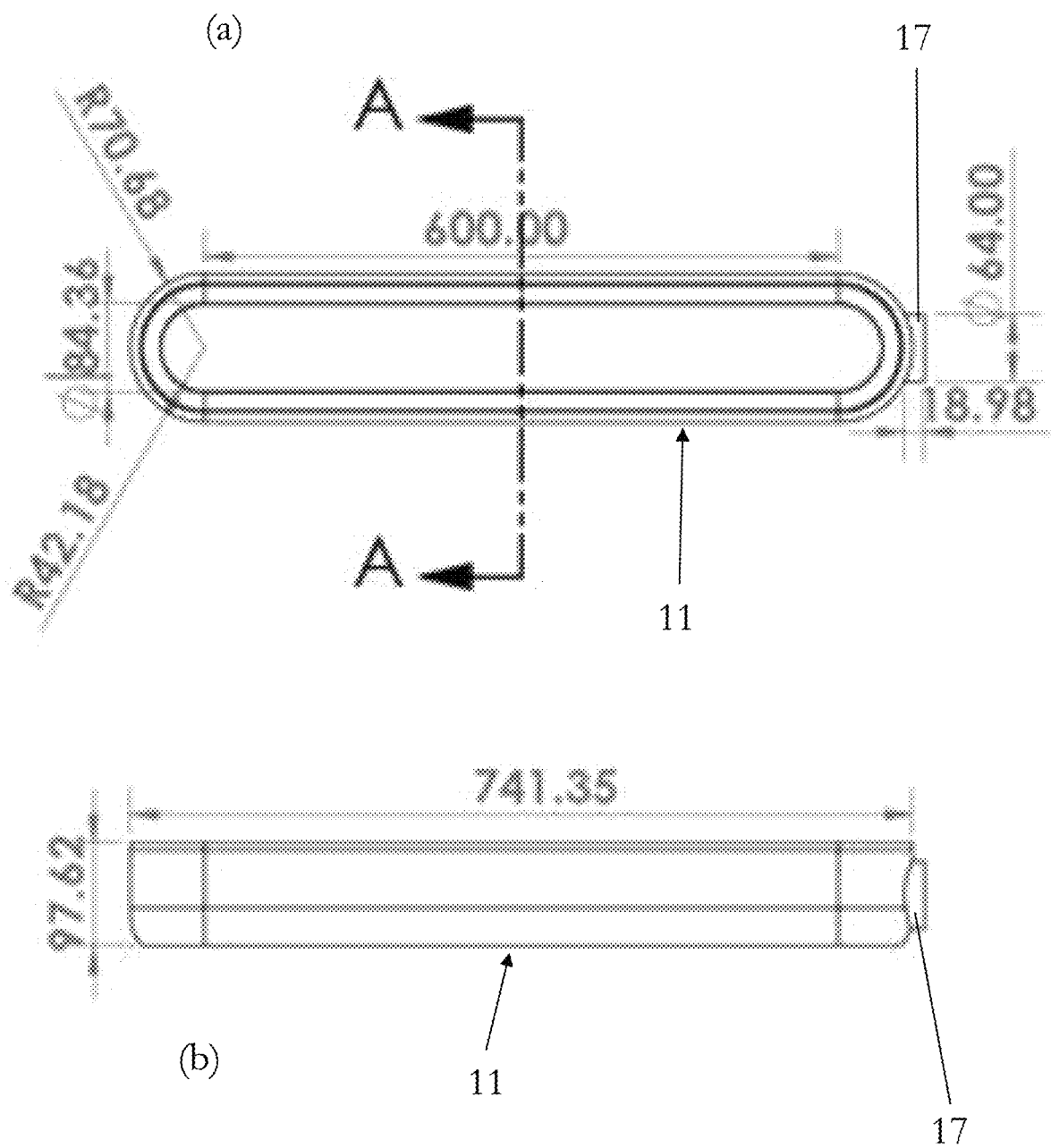
FIG. 3 shows plan views of the air multiplier of FIG. 2.
Figure 4:
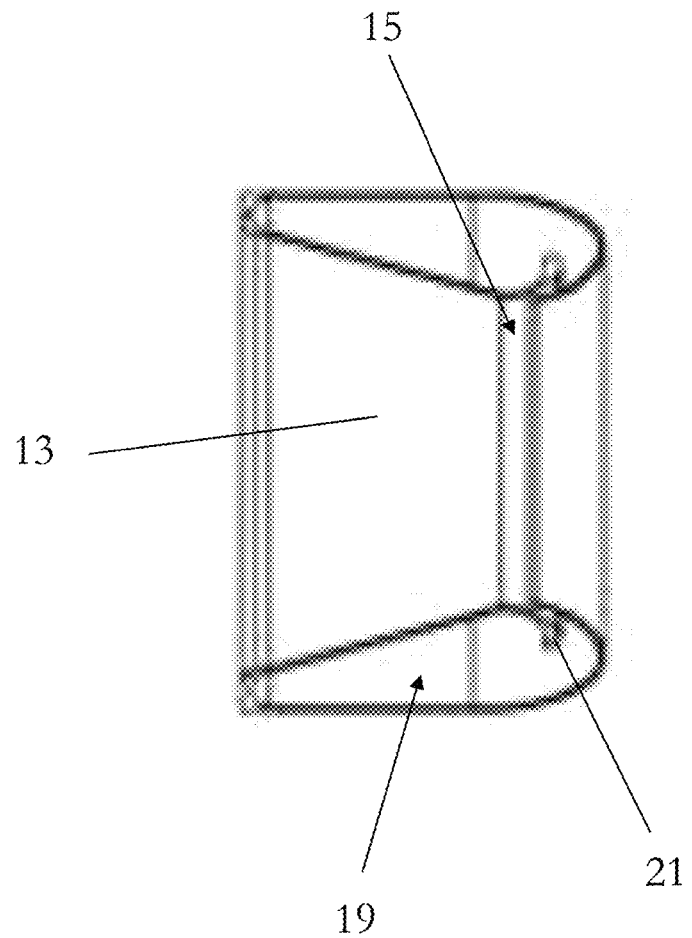
FIG. 4 shows a cross-sectional view of the air multiplier of FIGS. 2 and 3, taken along the line A-A in FIG. 2.

FIG. 4 shows a cross-sectional view of the air multiplier of FIGS. 2 and 3, taken along the line A-A in FIG. 2. The interior volume 19 is shown hollow, as this can be supplied by the compressed air inlet 17 with compressed air; however, other internal arrangements are also possible, in which compressed air is fed directly to the compressed air outlet 15.

Inside the compressed air outlet 15 is a guiding vane for ensuring directional flow of compressed air out of the compressed air outlet 15, such that it flows over the surface 13.

The invention claimed is:

1. A forced induction system for an internal combustion engine, the forced induction system comprising:
a first compressor configured to produce a first compressed air stream;
an air multiplier arranged to receive the first compressed air stream and eject the first compressed air stream over a Coandă surface, the air multiplier configured to entrain ambient air with the ejected first compressed air stream to produce a second stream of gas, wherein the first compressed air stream is supplied from the first compressor to the air multiplier by a vortex tube; and
a second compressor arranged to receive the second stream of gas, and configured to compress the second stream of gas for supply to an internal combustion engine.

2. The forced induction system of claim 1, further comprising a screen for filtering the ambient air prior to its entrainment by the air multiplier.

3. An internal combustion engine system comprising:
the forced induction system of claim 1; and
an internal combustion engine arranged to receive the compressed second stream of gas from the second compressor.

4. The internal combustion engine system of claim 3, wherein the first and/or second compressor is driven by an exhaust of the internal combustion engine.

5. A method of forced induction for an internal combustion engine, the method comprising:
providing the system of claim 1;
using the first compressor to produce a first compressed air stream;
using the air multiplier to eject the first compressed air stream over a Coandă surface, and entrain ambient air with the ejected first compressed air stream to produce a second stream of gas; and
using the second compressor to compress the second stream of gas.

6. The method of claim 5, further comprising supplying the compressed second stream of gas to an internal combustion engine.

* * * * *